US008785524B2

(12) United States Patent
Wu et al.

(10) Patent No.: US 8,785,524 B2
(45) Date of Patent: Jul. 22, 2014

(54) SPRAY COATABLE ADHESIVE FOR BONDING SILICON DIES TO RIGID SUBSTRATES

(75) Inventors: Xiaoming Wu, Lexington, KY (US); Paul Dryer, Lexington, KY (US); David Rhine, Georgetown, KY (US); Anna Pearson, Richmond, KY (US); Jeanne Marie Saldanha Singh, Lexington, KY (US); Richard Wells, Westerville, OH (US); Joel Provence, Delaware, OH (US)

(73) Assignee: Funai Electric Co., Ltd., Osaka (JP)

( * ) Notice: Subject to any disclaimer, the term of this patent is extended or adjusted under 35 U.S.C. 154(b) by 172 days.

(21) Appl. No.: 13/168,063

(22) Filed: Jun. 24, 2011

(65) Prior Publication Data

US 2011/0319513 A1 Dec. 29, 2011

Related U.S. Application Data

(60) Provisional application No. 61/358,179, filed on Jun. 24, 2010.

(51) Int. Cl.

*C08K 5/06* (2006.01)
*C08K 5/07* (2006.01)
*C08L 63/02* (2006.01)

(52) U.S. Cl.

USPC .......................................... 523/427; 525/524

(58) Field of Classification Search

None

See application file for complete search history.

(56) References Cited

U.S. PATENT DOCUMENTS

| | | | | |
|---|---|---|---|---|
| 6,193,359 | B1 | 2/2001 | Patil | |
| 6,358,354 | B1 | 3/2002 | Patil | |
| 6,834,937 | B2 | 12/2004 | Killmeier et al. | |
| 7,571,979 | B2 | 8/2009 | Patil | |
| 7,709,553 | B2 * | 5/2010 | Ito et al. | 522/168 |
| 7,766,455 | B2 | 8/2010 | Graham | |
| 2003/0017341 | A1 | 1/2003 | Gross | |
| 2005/0113474 | A1 * | 5/2005 | Kropp et al. | 522/1 |
| 2006/0207720 | A1 | 9/2006 | Yoshizawa | |
| 2007/0236542 | A1 | 10/2007 | Graham | |
| 2008/0085985 | A1 * | 4/2008 | Nakamura et al. | 528/25 |
| 2009/0071936 | A1 * | 3/2009 | Park et al. | 216/27 |
| 2011/0014354 | A1 | 1/2011 | Graham | |
| 2011/0033614 | A1 * | 2/2011 | Nakashiba et al. | 427/163.2 |
| 2011/0038065 | A1 * | 2/2011 | Miyawaki et al. | 359/819 |

FOREIGN PATENT DOCUMENTS

WO WO 2010/110495 A1 * 9/2010

OTHER PUBLICATIONS

King Industries, Inc. High Performance Products for Coatings, Inks, Adhesives and Sealants, 2006, four pages.*

* cited by examiner

*Primary Examiner* — Robert Sellers

(74) *Attorney, Agent, or Firm* — Amster, Rothstein & Ebenstein LLP

(57) ABSTRACT

A spray coatable adhesive composition used for bonding silicon dies to a rigid substrate, preferable a silicon substrate is disclosed. The adhesive composition includes an epoxy based resin, a thermal acid generator, a photoacid generator and a solvent. The epoxy based resin includes a mixture of a solid bisphenol A epoxy resin and a liquid or semi-liquid hydrogenated bisphenol A epoxy resin at a weight ratio ranging from about 80:20 to about 65:35. The adhesive composition has a low viscosity which allows it to be spray coated on a rigid substrate and form thin film adhesive which allows silicon dies to be bonded with precise placement on the silicon substrate.

16 Claims, 3 Drawing Sheets

SPRAY COATABLE ADHESIVE FOR BONDING SILICON DIES TO RIGID SUBSTRATES

CROSS REFERENCES TO RELATED APPLICATIONS

This patent application is related to and claims the priority to U.S. Provisional Patent Application Ser. No. 61/358,179, filed Jun. 24, 2010, entitled "Formula and Process for Ejection Chips in Micro-fluid Applications" and assigned to the assignee of the present application.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present disclosure generally relates to micro-fluid ejection devices, such as inkjet printers. More particularly, although not exclusively, it relates to spray coatable adhesive used for bonding silicon chips of ejection heads to rigid substrates.

2. Description of the Related Art

In the field of micro-fluid ejection devices, ink jet printers are an example application where miniaturization continues to be pursued. This includes miniaturization of ejection chips or dies to reduce material cost of ejection heads. In reducing the ejection chip size, it is usually the chip width that must be decreased while the chip length would be tailored to the cost/performance requirements of a particular printing application. These ejection chips are typically coupled with a rigid support substrate such as a silicon substrate having one or more flow features. So as ejection chips get smaller, the bonding and sealing widths to the support this rigid silicon substrate must be reduced to less than 500 microns. This miniaturization of ejection chips then leads to challenges relating to techniques and adhesive used for bonding the chips on the support substrate. This bonding must provide narrow and robust seals and proper chip alignment to flow features of the support substrate.

A typical way of bonding chips to a substrate is to dispense a die attach adhesive onto the substrate through a needle. This type of die attach adhesive has a high viscosity ranging from about 60,000 to 100,000 centipose (cps) in which the smallest bond width it can reliably provide upon dispensed and prior to mounting of the chip, are in the range of 450-500 μm. It becomes difficult to dispense such adhesives onto a densely patterned substrate allowing a bond line and sealing width much smaller than the adhesive dispensing width. It would be advantageous to provide an adhesive composition having low viscosity which is spray to coatable and can be uniformly applied on a substrate having through holes and channels, form a robust seal with narrow widths, allow precise alignment of chips on a substrate, and has good compatibility with an ink jet printer environment. Thus, there continuous to be a need for improved adhesive composition and bonding techniques for miniaturized ejection head components of ink jet printers. This is especially true when a rigid silicon chip needs to be bonded onto a silicon substrate.

SUMMARY

The present disclosure provides an adhesive composition having low viscosity and is spray coatable. This ease of application allows the adhesive composition of the present invention to be uniformly applied on a substrate having through holes and channels and form a robust seal with narrow widths. The adhesive composition of the present invention provides particularly good adhesion between a silicon die and a silicon substrate. This adhesive composition includes an epoxy based resin, a thermal acid generator, a photoacid generator and a solvent. The adhesive composition is spray coatable and can be cured upon exposure to radiation and heat, thus allowing chips to be bonded on a wafer level with precise placement. Further, the adhesive composition provides a robust seal at very narrow seal width of less than 400 μm and a thin bond line of less than 20 μm, thus maintaining good adhesion between a rigid silicon die and a silicon substrate in an ink jet printer environment.

The features and advantages of the present disclosure will be more understood through the detailed description and in reference to the figures which follow.

DETAILED DESCRIPTION

Figure 1:
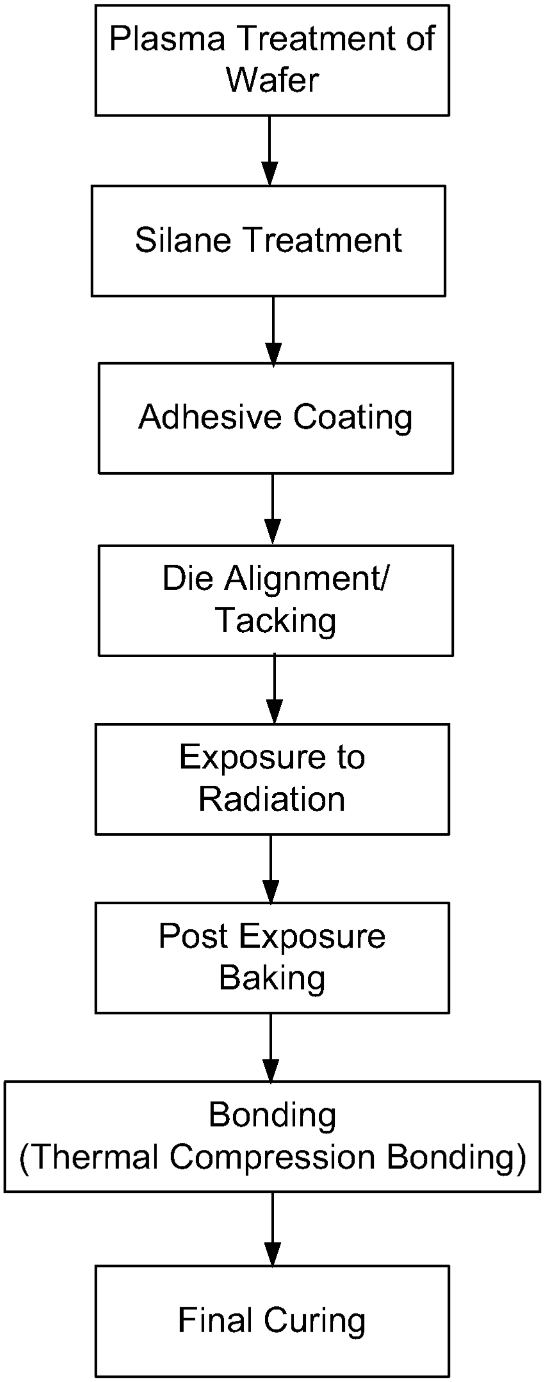
FIG. 1 is a schematic diagram of a chip to wafer bonding process using the adhesive composition of the present disclosure.

It is to be understood that various omissions and substitutions of equivalents are contemplated as circumstances may suggest or render expedient, but these are intended to cover the application or implementation without departing from the spirit or scope of the claims of the present disclosure. It is to be understood that the present disclosure is not limited in its application to the heater chip of an ink jet printhead set forth in the following description. The present disclosure is capable of other embodiments and of being used in various applications. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the terms "a" and "an" herein do not denote a limitation of quantity, but rather denote the presence of at least one of the referenced item.

The present disclosure provides an adhesive composition having low viscosity for ease of application and is suitable for bonding chips or dies on a wafer. The adhesive composition includes an epoxy based resin, a thermal acid generator, a photoacid generator and a solvent. The adhesive composition of the present invention is spray coatable and provides particularly good adhesion between a silicon die and a silicon substrate The epoxy based resin includes a mixture of a solid epoxy resin and a liquid or semi-liquid epoxy resin. A suitable example of the solid epoxy resin includes a bisphenol A epoxy resin available from Hexion Performance Chemicals, Inc. under the trade name EPON 1007F having an epoxide equivalent of greater than about 1000 g/eq. An "epoxide equivalent" is the number of grams of resin containing 1 gram-equivalent of epoxide. An example of liquid or semi-liquid epoxy resin includes a hydrogenated bisphenol A epoxy resin available from CVC Thermoset Specialties Division of Emerald Performance Materials under the trade name EPALLOY 5000 having an epoxide equivalent of about 210 to about 230 g/eq. EPON 1007F and EPALLOY 5000 are difunctional epoxy resins and a person of ordinary skill in the art can calculate its average molecular weight based on the epoxide equivalent. EPON 1007F is a high molecular weight epoxy resin having an average molecular weight of greater than 2000 Daltons. EPALLOY 5000 is a low molecular weight epoxy resin having an average molecular weight of less than 500 Daltons. The inventors have discovered that by controlling the ratio of the solid epoxy resin to the liquid or semi-liquid epoxy resin, an adhesive composition being non-tacky at ambient condition is provided. This allows for ease of handling and transport while providing tack when exposed to heat for ease of tacking the dies. The ratio of the solid epoxy resin to liquid or semi-liquid epoxy resin in the adhesive composition may be in a range from about 80:20 to about 65:35. The most preferred ratio is 65:35.

A suitable example of a thermal acid generator is an antimony-based thermal acid generator such as ammonium hexafluoroantimonate thermal acid generator available from King Industries under the trade name NACURE XC-7231 having an activation temperature of about 90° C. A higher concentration of thermal acid generator results in ink flocculation issues while lower concentration results in insufficient curing. The amount of thermal acid generator in the adhesive composition ranges from about 1.5 to about 3 parts by weight per 100 parts by weight of the epoxy based resin. The amount of thermal acid generator preferably is about 1.5 to about 2 parts by weight per 100 parts by weight of the epoxy based resin. Most preferably, the thermal acid generator is about 1.5 parts by weight per 100 parts by weight of the epoxy based resin. This preferred amount of thermal acid generator results in an adhesive composition having an optimum glass transition temperature of about 90° C. to about 100° C., thereby providing an adhesive composition exhibiting sufficient curing, good ink compatibility and good adhesion.

The photoacid generator allows the rheology of the adhesive composition to change upon exposure to radiation and heat. There are many types of photoacid generators commercially available. A particularly preferred type of photoacid generator is a tris(trifluoromethanesulfonyl)methide photoacid generator. This type of photoacid generator is available from Ciba Inc. under trade designation GSID 26-1. The amount of photoacid generator in the adhesive composition is about 1.5 to about 3 parts by weight per 100 parts by weight of the epoxy based resin. More preferably, the photoacid acid generator is about 1.5 to about 2 parts by weight per 100 parts by weight of the epoxy based resin. Most preferably, the photoacid generator is 1.5 parts by weight per 100 parts by weight of the epoxy based resin. This preferred amount of photoacid generator results in an adhesive composition having an optimum glass transition temperature of about 90° C. to about 100° C., thereby providing an adhesive composition exhibiting sufficient curing, good ink compatibility and to good adhesion. The adhesive composition may preferably include the thermal acid generator and the photoacid generator at a weight ratio of about 1:2 to about 2:1. More preferably, the ratio of thermal acid generator to the photoacid generator is about 1:1 to about 1:2. Most preferably, the weight ratio of the thermal acid generator to the photoacid generator is 1:1.

A suitable example of a solvent needed to provide the appropriate viscosity to the adhesive composition of the present invention is methyl ethyl ketone (MEK) or propylene glycol monomethyl ether acetate (PGMEA). The adhesive composition preferably has a viscosity of less than about 10 cps. Most preferably, the adhesive composition of the present invention has a viscosity of about 1 to about 2 cps, thereby making it suitable for the desired spray coatable application. MEK is a volatile solvent and has a lower boiling point than PGMEA. The adhesive composition preferably includes a MEK solvent which provides good spray coating performance and sufficient solvent removal.

The adhesive composition of the present invention optionally includes a silane adhesion promoter. Suitable example of silane adhesion promoter is an epoxy silane such as 3-glycidyloxypropyl trimethoxysilane commercially available from Sigma Aldrich Corporation. Adhesion may also be improved by applying a silane adhesion promoter to at least one of the adhering surfaces. These adhering surfaces may include an adhering substrate surface, die surface or adhesive coating surface.

The adhesive composition of the present disclosure can be applied on a substrate through spray coating. It uniformly coats the substrate and forms a thin film adhesive having a thickness of less than about 20 μm, thus making it suitable for bonding one or more miniaturized dies or chips on a chip-to-wafer level. FIG. 1 illustrates a process flow for bonding dies to a wafer. The bonding technique includes spray coating an adhesive composition on a cleaned or treated wafer surface, aligning and tacking dies on the adhesive coated wafer, exposing to radiation and heat, performing thermal compression bonding, and baking for final cure of the adhesive.

The wafer can be a silicon wafer and may include one or more vias and alignment fiducials (reference points). The one or more vias may be formed through deep reactive ion etching (DRIE) process. The wafer may be cleaned with a combination of oxygen and argon plasma. The cleaned wafer surface may be further treated with silane adhesion promoter. The silane adhesion promoter may be applied with a spinner followed by a 25 minute oven bake at 112° C.

The adhesive composition may be applied onto the wafer surface using commercially available spray coating equipment such as the spray coating equipment available from the EV Group of Phoenix, Ariz. under the trade name EVG-101. The spray coated adhesive is preferably baked at 70° C. for 40 minutes in a convection oven to remove the solvent.

The die to be bonded on the wafer may be a silicon die such as the silicon die of a heater chip for a printhead of an ink jet printer. The silicon die may include a photo imageable nozzle plate (PINP). The adhesive composition of the present disclosure can be cured at a temperature below the glass transition temperature of the PINP, preferably at temperature of below 140° C., thus preventing damage of PINP during the bonding process.

The alignment and tacking conditions are selected such that the die surface is sufficiently wetted by the adhesive coating with undue squeeze out and inadvertent cure of the adhesive coating. The total time and temperature for aligning and tacking the dies are held within a range in which the adhesive coating remains tacky with minimal initiation of cross-linking. The dies are preferably aligned at the wafer surface heated at about 70° C. to about 80° C. and tacked at pressures of about 1 to about 5 psi.

Exposing the wafer with the tacked dies to radiation and heat, solidifies the exposed area of the adhesive coating and restricts the movement of the die upon thermal compression bonding. The wafer with the tacked dies is preferably exposed to an ultraviolet light of 364 nm at 1 J/cm$^2$ and then baked at 70° C. for 1 minute. Thermal compression bonding is then performed and followed by a final curing step to complete the bonding process. The final curing may be conducted at a temperature of about 130° C. for about 2 hours. After the final cure, the bonded die-to-wafer assembly is diced.

Figure 2:
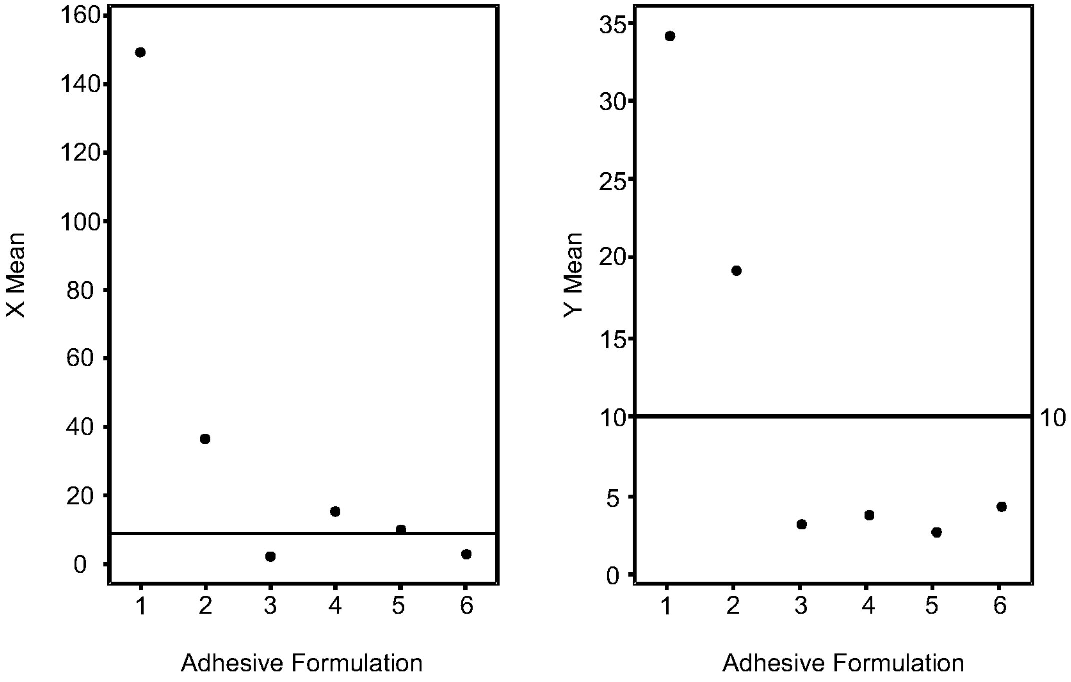
FIG. 2 is a graphical illustration of the average die movement measured after thermal compression bonding of silicon die on wafer using the adhesive composition of the present disclosure.

The particular type of photoacid generator used in the adhesive composition of the present invention helps in keeping the die in place during thermal compression bonding and final curing. During UV radiation exposure, the photoacid generator in the adhesive composition is activated and forms super acid which initiates epoxy cross-linking reaction upon additional heat exposure. The exposed adhesive area cross-links and solidifies which then prevents die movement in subsequent thermal compression bonding and final curing. FIG. 2 illustrates average displacement of silicon dies from corresponding alignment fiducials in silicon wafer after thermal compression bonding using adhesive formulations listed in Table 1. These average die displacements are measured along X and Y axes.

TABLE 1

| Adhesive Formulation | EPON1007F/ EPALLOY5000 resin weight ratio | Thermal Acid Generator per hundred resin (phr) | Photoacid Generator per hundred resin (phr) | Maximum Die Movement (μm) |
|---|---|---|---|---|
| 1 | 65/35 | 3 | 0 | 160 |
| 2 | 65/35 | 1.5 | 1 | 40 |
| 3 | 65/35 | 1.5 | 1.5 | 6 |
| 4 | 65/35 | 2 | 1.5 | 15 |
| 5 | 65/35 | 3 | 1.5 | 10 |
| 6 | 65/35 | 1.5 | 3 | 6 |

With reference to FIG. 2, an average die movement of more than 100 μm was measured along X axis when using the adhesive composition without photoacid generator, such as the Adhesive Formulation 1. Average die movement of less than 100 microns was measured along both X and Y axes when bonding using adhesive composition containing photoacid generator, such as Adhesive Formulations 2, 3, 4, 5 and 6. The use of adhesive composition of the present disclosure in bonding silicon dies to silicon wafer can restrict die movement to less than about 10 microns as observed with Adhesive Formulations 3 and 6. Adhesion performance of the adhesive formulations listed in Table 1 was evaluated. In reference to Table 2, Adhesive Formulation 1, not containing photoacid generator, provides better adhesion even without additional silane treatment on the adhesive coating surface during bonding. With Adhesive Formulation 1, a force of above 200 N was required to peel the bonded silicon die from the wafer after soaking in water at a temperature of 100° C. for 8 hours. On the other hand, a peeling force of less than 200 N was required when using Adhesive Formulations 3, 4, 5 and 6, containing photoacid generator, without additional silane treatment on the adhesive coating surface during bonding. But, adhesion strength of the adhesive composition of the present disclosure can be improved by an additional silane to treatment on the adhesive coating surface during bonding, as shown by the results of Adhesive Formulation 3 in Table 2 in which peeling force increased from 145 N to 225 N.

TABLE 2

| Adhesive Formulation | 1 | 2 | 3 | 4 | 5 | 6 |
|---|---|---|---|---|---|---|
| Adhesion Strength in terms of Peel Force, N (w/o silane treatment on top adhesive coating surface) | 225 | 205 | 145 | 158 | 150 | 110 |
| Adhesion Strength in terms of Peel Force, N (w/ silane treatment on top adhesive coating surface) | 220 | | 225 | | | |
| Minimum Seal Width, μm (through Helium Leak test) | 80 | | 80 | | | |
| Corrosion Resistance | | | Good | | | |
| Ink Flocculat'on Robustness | | | Pass | Pass | Pass | |
| Ink Resistance, wt. % change (dye based ink) | −0.15 | 0.60 | 1.22 | | | |
| Ink Resistance, wt. % change (pigment based ink) | −1.00 | 0.39 | 0.79 | | | |

Figure 3:
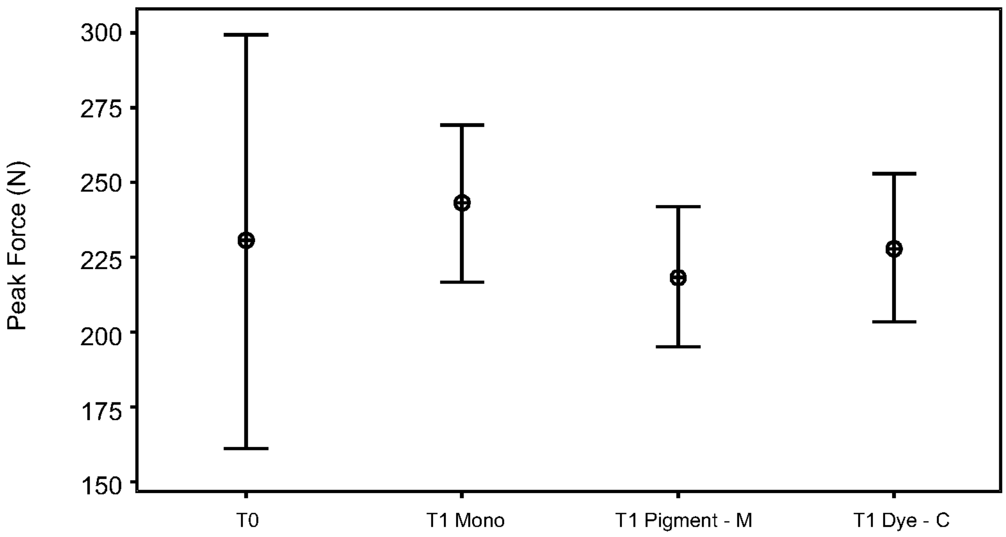
FIG. 3 is a graphical illustration of the adhesive strength of the adhesive composition of the present disclosure in an ink environment.

FIG. 3 graphically illustrates the average force required to peel a silicon die bonded on a wafer using Adhesive Formulation 3 with additional silane treatment on adhering surfaces, and taken before (T0) and after one week (T1) soaking in cyan ink (Dye-C), magenta pigment ink (Pigment-M) and mono pigment (Mono) at a temperature of 60° C. There was no degradation on the adhesive strengths of the Adhesive Formulation 3 after soaking in ink at a temperature of 60° C. for one week. This confirms that the adhesive composition of the present disclosure maintains good adhesion performance with an ink environment. It can provide a robust ink seal having good corrosion and ink resistance.

By performing various tests, the inventors have determined that Adhesive to Formulation 3 is the most preferable. As presented in Table 2, the bond formed from Adhesive Formulation 3 showed a weight change of 1.22% after soaking in dye based ink at a temperature of 60° C. for 10 weeks, and a weight change of 0.79% after soaking in pigment based ink at a temperature of 60° C. for 10 weeks. Adhesive Formulation 3 also passed ink flocculation robustness test in which there was no significant growth of pigment ink particles after soaking in ink at a temperature of 60° C. for 4 weeks. This indicates that Adhesive Composition 3 provides a robust ink seal having good resistance to ink and corrosion.

The adhesive composition of the present disclosure can reliably seal at a width as narrow as 80 μm, as confirmed by the helium (He) leak test result of Adhesive Formulation 3 presented in Table 2. The basic leak test structure consists of a silicon or glass wafer with fluidic ports bonded to another wafer consisting of etched channels. The etched channels are paired through a seal having widths ranging from 80 μm to 400 μm. The wafer is positioned on an X/Y table such that the pressurized He flow channel is over one access port, and an adjacent "sniff/sense" channel being separated from the He flow channel with the seal at a width of interest is over another access port leading to a mass spectrometer (MS). The seals are lowered onto the test wafer. The tester evacuates both channels and then opens the valve which supplies He at about 1 atm (14.7 psia) pressure to the He flow channel. The MS detects the He that leaks through the seal which separates the He flow channel from the sniff/sense channel. The MS reads over time the He flow rate coming from the "sniff/sense" access port. The tester waits for the leaked He flow rate to stabilize, i.e. around 30 seconds. A leaked He flow rate of less than $1\times10^{-8}$ $cm^3/s$ is considered as "pass".

An example preparation of the most preferred adhesive composition of the present disclosure is presented in Table 3. This composition is listed as Adhesive Formulation 3 in Tables 1 and 2. It is to be understood that this adhesive composition and the evaluation results that has been described provide an example illustration of the present disclosure and should not be construed as a limitation of the present disclosure.

TABLE 3

| Component | Trade Name/ Common Name | Chemical Description | Loading | Supplier |
|---|---|---|---|---|
| Resin | EPON 1007F | solid bisphenol A epoxy resin | 65 wt. % resin | Hexion Performance Chemicals |
| | EPALLOY 5000 | viscous liquid hydrogenated bisphenol A epoxy resin | 35 wt. % resin | CVC Thermoset Specialties |
| Thermal Acid Generator | NACURE XC-7231* | ammonium hexafluoroantimonate | 1.5 phr | King Industries |
| Photoacid Generator | GSID 26-1 | tris(trifluoromethanesulfonyl) methide | 1.5 phr | Ciba Inc. |
| Adhesion Promoter | Silane | 3-glycidyloxypropyl trimethoxysilane | 1.35 phr | Sigma Aldrich Corp. |
| Solvent | MEK | methyl ethyl ketone | 1560 phr | Sigma Aldrich Corp. |

*NACURE XC-7231 is pre-disolved in gama-butyrolactone (Sigma-Aldrich) at weight ratio of 50:50

The foregoing description of several methods and an example of the present disclosure has been presented for purposes of illustration. It is not intended to be exhaustive to or to limit the invention to the precise steps and/or forms disclosed, and obviously many modifications and variations are possible in light of the above teaching. It is intended that the scope of the invention be defined by the claims appended hereto.

What is claimed is:

1. A spray coatable adhesive composition comprising an epoxy based resin, a thermal acid generator, a photo acid generator and a solvent, wherein the epoxy based resin consists of a mixture of a solid bisphenol A epoxy resin and a liquid or semi-liquid hydrogenated bisphenol A epoxy resin at a weight ratio ranging from about 80:20 to about 65:35.

2. The spray coatable adhesive composition of claim 1, wherein the weight ratio of the solid bisphenol A epoxy resin to the liquid or semi-liquid hydrogenated bisphenol A epoxy resin is about 65:35.

3. The spray coatable adhesive composition of claim 1, wherein a weight ratio of the thermal acid generator to the photoacid generator is about 1:2 to about 2:1.

4. The spray coatable adhesive composition of claim 3, wherein the weight ratio of the thermal acid generator to the photoacid generator is about 1:1 to about 1:2.

5. The spray coatable adhesive composition of claim 4, wherein the weight ratio of the thermal acid generator to the photoacid generator is 1:1.

6. The spray coatable adhesive composition of claim 1, wherein the amount of the thermal acid generator is about 1.5 to about 3.0 parts by weight per 100 parts by weight of the epoxy based resin.

7. The spray coatable adhesive composition of claim 6, wherein the amount of the thermal acid generator is about 1.5 to about 2.0 parts by weight per 100 parts by weight of the epoxy based resin.

8. The spray coatable adhesive composition of claim 7, wherein the amount of the thermal acid generator is about 1.5 parts by weight per 100 parts by weight of the epoxy based resin.

9. The spray coatable adhesive composition of claim 1, wherein the amount of the photo acid generator is about 1.5 to about 3.0 parts by weight per 100 parts by weight of the epoxy based resin.

10. The spray coatable adhesive composition of claim 9 wherein the amount of the photo acid generator is about 1.5 to about 2.0 parts by weight per 100 parts by weight of the epoxy based resin.

11. The spray coatable adhesive composition of claim 10, wherein the amount of the photo acid generator is about 1.5 parts by weight per 100 parts by weight of the epoxy based resin.

12. The spray coatable adhesive composition of claim 1, wherein the thermal acid generator comprises ammonium hexafluoroantimonate.

13. The spray coatable adhesive composition of claim 1, wherein the photoacid generator comprises tris(trifluoromethanesulfonyl)methide.

14. The spray coatable adhesive composition of claim 1, wherein the solvent comprises methyl ethyl ketone.

15. The spray coatable adhesive composition of claim 1, wherein the solvent comprises propylene glycol methyl ether acetate.

16. The spray coatable adhesive composition of claim 1, wherein the adhesive composition further comprises a silane adhesion promoter.

* * * * *